US012739278B2

(12) United States Patent
Bhatnagar et al.

(10) Patent No.: US 12,739,278 B2
(45) Date of Patent: Sep. 15, 2026

(54) MULTI-FACTOR AUTHENTICATION FATIGUE ATTACK DETECTION AND BLOCKING

(71) Applicant: Palo Alto Networks, Inc., Santa Clara, CA (US)

(72) Inventors: Mayank Bhatnagar, Bangalore (IN); Rajesh Rawal, Bangalore (IN); Shiv Mohan, Ghazipur (IN)

(73) Assignee: Palo Alto Networks, Inc., Santa Clara, CA (US)

( * ) Notice: Subject to any disclaimer, the term of this patent is extended or adjusted under 35 U.S.C. 154(b) by 242 days.

(21) Appl. No.: 18/544,763

(22) Filed: Dec. 19, 2023

(65) Prior Publication Data

US 2025/0202933 A1 Jun. 19, 2025

(51) Int. Cl.
*H04L 9/40* (2022.01)

(52) U.S. Cl.
CPC .......... *H04L 63/1458* (2013.01); *H04L 63/08* (2013.01); *H04L 2463/082* (2013.01)

(58) Field of Classification Search
CPC . H04L 63/14; H04L 63/1408; H04L 63/1416; H04L 63/1433; H04L 63/1441; H04L 63/164
See application file for complete search history.

(56) References Cited

U.S. PATENT DOCUMENTS 9,571,497 B1 * 2/2017 Venkataramani ....... H04L 63/10
2023/0179612 A1 * 6/2023 Inon ...................... H04L 63/083 726/23
2024/0098113 A1 * 3/2024 Rajakumar ............. H04L 63/08
2025/0080546 A1 * 3/2025 Aoki ......................... H04L 9/14

* cited by examiner

*Primary Examiner* — Daniel B Potratz
(74) *Attorney, Agent, or Firm* — Gilliam IP PLLC

(57) ABSTRACT

An MFA fatigue attack detector has been created that correlates MFA failure events for evaluation against a MFA fatigue attack detection rule to determine whether a user is likely a target of a MFA fatigue attack. The MFA fatigue attack detection rule is defined based on correlation of failure events for a MFA implementation and a determination of a threshold that can be considered a boundary marking the transition of behavior, as represented by the MFA failure events, from non-suspicious to suspicious. To determine what events to correlate and the thresholds for different MFA implementations, network traffic and/or API calls for different IdPs are analyzed. Based on the analysis, failure events are identified and thresholds of correlated failure events (e.g., a time window and number of failure events within the time window) are determined for the implementations that avoid false positives while still protecting users against MFA fatigue attacks.

20 Claims, 3 Drawing Sheets

MULTI-FACTOR AUTHENTICATION FATIGUE ATTACK DETECTION AND BLOCKING

BACKGROUND

The disclosure generally relates to multi-factor authentication (e.g., CPC subclass H04L 63/08) and attack detection (e.g., CPC subclass G06F 21/00).

Authentication is the verification of the identity of a user, process, or device. Authentication is implemented as a prerequisite for accessing a resource. An 'identity' may represent a human or a non-human entity and may be either individual or organizational. The glossary of the National Institute of Standards and Technology (NIST) defines multi-factor authentication as "Authentication using two or more factors to achieve authentication. Factors include: (i) something you know (e.g., password/personal identification number (PIN)); (ii) something you have (e.g., cryptographic identification device, token); or (iii) something you are (e.g., biometric)."

BRIEF DESCRIPTION OF THE DRAWINGS

Embodiments of the disclosure may be better understood by referencing the accompanying drawings.

DESCRIPTION

Figure 1:
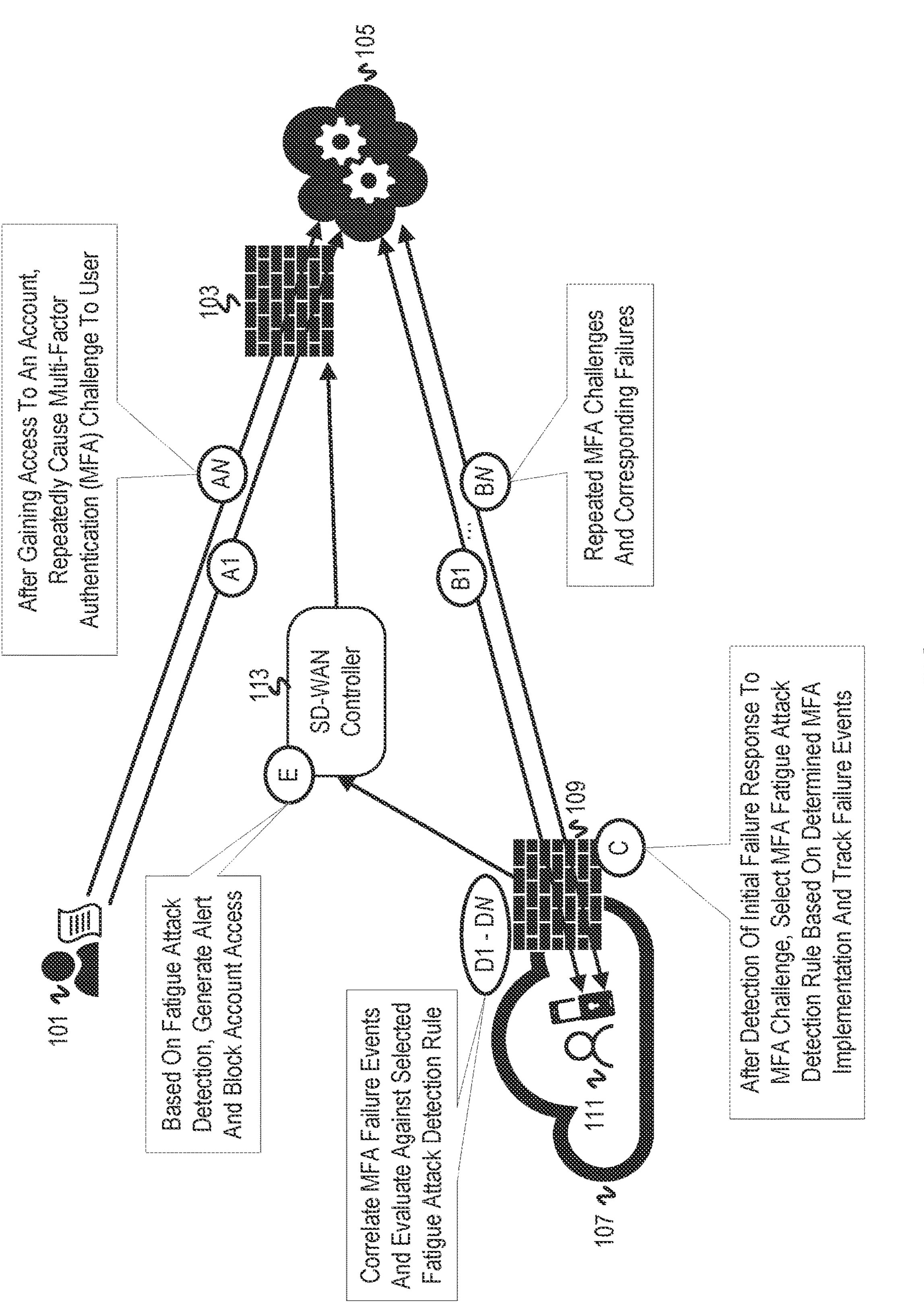
FIG. 1 depicts a diagram of a system with a multi-factor authentication (MFA) fatigue attack detector deployed on a firewall.

The description that follows includes example systems, methods, techniques, and program flows to aid in understanding the disclosure and not to limit claim scope. Well-known instruction instances, protocols, structures, and techniques have not been shown in detail for conciseness.

Terminology

The description refers to "MFA failure events." The term "MFA failure event" or "failure event" refers to a response to a MFA challenge that does not result in a successful authentication. A failure event is communicated in a layer 2/3 packet, such as a transmission control protocol (TCP)/Internet Protocol (IP) packet or in an application layer message (e.g., a hypertext transfer protocol (HTTP) message). The failure event may be communicated in an application programming interface (API) call that is conveyed in a message. However communicated, the response can indicate a deny response, cancellation of a prompt, or a timeout for responding to a MFA challenge.

Use of the phrase "at least one of" preceding a list with the conjunction "and" should not be treated as an exclusive list and should not be construed as a list of categories with one item from each category, unless specifically stated otherwise. A clause that recites "at least one of A, B, and C" can be infringed with only one of the listed items, multiple of the listed items, and one or more of the items in the list and another item not listed.

Overview

A MFA fatigue attack, sometimes referred to as a MFA bombing attack, relies on overwhelming a user with repeated MFA prompts or challenges until the user provides the authentication factor out of frustration or mistake. While a customer or identity provider ("IdP") may be able to tighten MFA parameters in response to fatigue attacks (e.g., reducing a number of allowed repeat MFA prompts), tightening parameters may introduce inconvenience that leads users to other behaviors more susceptible to social engineering attacks. In addition, the tightening of parameters is not implementable at a same level/measure since organizations often use multiple IdPs and an IdP has multiple customers.

An MFA fatigue attack detector has been created that correlates MFA failure events for evaluation against a MFA fatigue attack detection rule to determine whether a user is likely a target of a MFA fatigue attack. The MFA fatigue attack detection rule is defined based on correlation of failure events for a MFA implementation and a determination of a threshold that can be considered a boundary marking the transition of behavior, as represented by the MFA failure events, from non-suspicious to suspicious. To determine what events to correlate and the thresholds for different MFA implementations, network traffic and/or API calls for different IdPs are analyzed. Based on the analysis, failure events are identified and thresholds of correlated failure events (e.g., a time window and number of failure events within the time window) are determined for the implementations that avoid false positives in attack detection while still protecting users against MFA fatigue attacks. Rules can then be defined for each of the MFA implementations for MFA fatigue attack detection based on the identification of failure events, what events to correlate, and the defined thresholds.

EXAMPLE ILLUSTRATIONS

FIG. 1 depicts a diagram of a system with a MFA fatigue attack detector deployed on a firewall. It is assumed for FIG. 1 that a user 111 has an account with an organization that uses an IdP 105. A network of the IdP 105 is secured by a firewall 103. The user 111 is depicted as operating within a network 107 that is secured by a firewall 109.

FIG. 1 is annotated with a series of letters A1-AN, B1-BN, C, D1-DN, and E, each of which represents a stage of one or more operations. Although these stages are ordered for this example, the stages illustrate one example to aid in understanding this disclosure and should not be used to limit the claims. Subject matter falling within the scope of the claims can vary from what is illustrated.

At stage A1, a bad actor 101 triggers a MFA challenge to be sent to the user 111. The trigger is a response to a login with username and password as a first step in a login process. At stages A2-AN, the bad actor 101 continues to repeatedly cause MFA challenges to be sent to the user 111. To cause the MFA challenges, the bad actor 101 has previously gained access to an account. This may be an account of the user 111 or an account of a privileged user of the organization corresponding to the user 111. For example, the bad actor 101 may have gained access to an administrator account. To gain access, the bad actor 101 may have stolen credentials. While the bad actor 101 may manually trigger the repeated MFA challenges, the bad actor 101 likely runs program code, such as a script, to repeatedly trigger the MFA challenges.

At stage B1, the IdP 105 sends a MFA challenge to the user 111 based on the initial login step by the bad actor 101 and the user 111 denies the MFA challenge. In this illustration, a device is depicted with the user 111 which suggests a "what you possess" type of second authentication factor (the stolen login credentials being the first authentication factor). Thus, the MFA challenge is pushed to the device possessed by the user 111. The user 111 denies or dismisses the MFA challenge, which is treated as a MFA failure event. The MFA failure event is communicated to the IdP 105 via the firewall 109. In some cases, a bad actor can instead send a MFA challenge request to a IdP interface. An IdP interface is an IdP login page that an organization would have provided to the user 111. The IdP login page may or may not be in the network 107.

At stage C, the firewall 109, on which the MFA fatigue attack detector is deployed, selects a MFA fatigue attack detection rule based on a determined MFA and IdP implementation before the failure event is communicated to the IdP 105. The firewall 109 has been configured to monitor network traffic for a message conveying a MFA failure event. The firewall 109 can determine implementation based on data in a message header that indicates an IdP. As examples, the firewall 109 can determine that a message corresponds to a IdP based on a uniform resource location (URL) indicating an IdP or a message header field having a service identifier that identifies an authentication service. The firewall 109 can then examine a body of a message for indicators of a failure event. For example, the message body may have strings that explicitly state the message is a rejection of a factor authentication challenge. Based on the selected rule, the firewall 109 begins tracking failure events.

At stages D1-DN, if MFA fatigue happens or is in progress, the firewall 109 correlates MFA failure events and evaluates the correlated events against the selected MFA fatigue attack detection rule. For each failure event subsequent to the initial failure event, the firewall 109 correlates failure events that have been tracked. Thus, the firewall 109 evaluates correlated failure events against the selected MFA attack detection rule upon detection of each failure event. If the rule is satisfied, then the firewall 109 notifies a software-defined wide area network (SD-WAN) controller 113 of the detected MFA fatigue attack.

At stage E, the SD-WAN 113 generates an alert and blocks access of the account of the user 111 based on the notification from the firewall 109. The notification from the firewall 109 identifies the user 111 to allow the SD-WAN controller 113 to determine which account to block and configure the firewall 103 accordingly.

Embodiments do not necessarily involve a SD-WAN controller. A network-based firewall can take action according to a rule or policy defined on the firewall. Inline network security, such as intrusion detection system and/or intrusion prevention system can take action based on the MFA attack detection.

Figure 2:
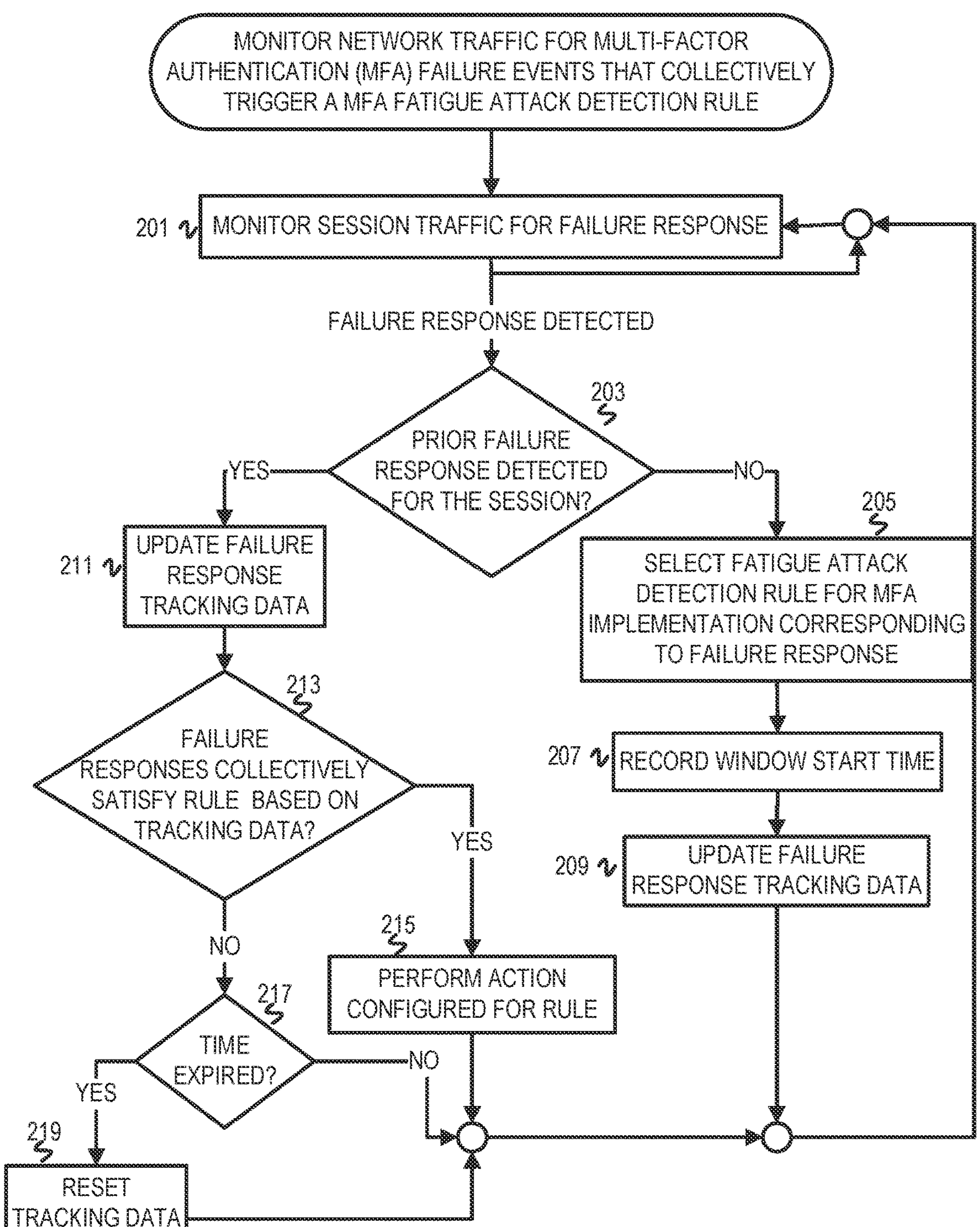
FIG. 2 is a flowchart of example operations for monitoring network traffic for MFA failure events that collectively trigger a MFA fatigue attack detection rule.

FIG. 2 is a flowchart of example operations for monitoring network traffic for MFA failure events that collectively trigger a MFA fatigue attack detection rule. The example operations of FIG. 2 correspond to a network security appliance deployment, such as on a hardware or software firewall. Such a deployment would be configuration of the security appliance with program code to perform the example operations of the MFA fatigue attack detector.

At block 201, the MFA fatigue attack detector monitors network traffic of session flows traversing the security appliance that hosts the fatigue attack detector. The security appliance is configured to examine headers of network traffic to determine whether a message is a failure response to a MFA challenge. Indication of a message being a failure response can be an individual value, such as a URL that indicates the message is an authentication factor failure response. In some cases, the indication is a combination of values. For instance, the URL can include a IdP identifier, a status field, and a factor result field. The security appliance continues monitoring traffic. If the security appliance detects a MFA failure response for a session, then operational flow proceeds to block 203.

At block 203, the MFA fatigue attack detector determines whether a prior failure response was detected for the session. The MFA fatigue attack detector will track MFA failure responses per session. For instance, the MFA fatigue attack detector can maintain a data structure with an entry per session identifier and update the data structure when a failure response is detected. If a prior failure response has been detected for the session, then operational flow proceeds to block 211. If not, then operational flow proceeds to block 205.

At block 205, the MFA fatigue attack detector selects a MFA fatigue attack detection rule for the MFA implementation corresponding to the failure response. From the failure response, the MFA fatigue attack detector can identify the IdP. If the IdP provides more than one MFA implementation, then MFA fatigue attack detector can also determine the type of MFA implementation. For example, the MFA fatigue attack detector can examine the message body to determine whether the MFA implementation is a push notification or one-time password/passcode (OTP). After determining MFA implementation, the MFA fatigue attack detector selects a rule mapped to an identifier of the MFA implementation. The MFA detection rule can indicate a time window and a threshold of failure events for the MFA implementation that can occur before it is deemed a fatigue attack. While rules can have common characteristics across implementations, such as time and number of detected events, the thresholds can vary. For example, analysis of API calls and/or network traffic for different MFA implementations may have yielded a rule for a push-based MFA implementation with smaller thresholds in terms of both number of failure events and time window than an OTP MFA implementation. The analysis can reveal a range or average number of failure events observed for legitimate MFA challenges per MFA implementation and parameters set by IdPs and/or IdP customers. In a firewall deployment of a MFA fatigue attack detector, a fatigue attack detection rule can be a matching rule to MFA fatigue attack signatures. Components of the fatigue attack signatures would be the characteristics.

At block 207, the MFA fatigue attack detector records a window start time. The MFA fatigue attack detector records the time of the first detected failure response of the session as the window start time.

At block 209, the MFA fatigue attack detector updates failure response tracking data. For example, the MFA fatigue attack detector updates a counter of failure responses to indicate the detected failure response for the session. Operational flow returns to block 201.

At block 211, the MFA fatigue attack detector updates failure response tracking data. The MFA fatigue attack detector accesses an entry in a tracking data structure for the session and updates a counter to reflect the detected failure response.

At block 213, the MFA fatigue attack detector determines whether failure responses collectively satisfy the MFA fatigue attack detection rule based on the response tracking data. For example, a rule for a push-based MFA implementation by IdP "example_IdP" indicates that a MFA fatigue attack detection criteria of 3 MFA challenge responses indicating REJECT within a 30 second time window. The criteria reflect the type of failure event (response messages) to correlate and a threshold for evaluating the correlated events (i.e., number of the failure events within a time window). If the criteria are satisfied, then an action configured for the rule is triggered. The action can be generation of a notification to a networking component, generating an alert to an administrator, generating an alert to the user, etc. The MFA fatigue attack detector looks up an entry in the tracking data structure with a session identifier and user identifier, for example. The entry will indicate a start window time and a number of detected MFA failure responses including the current failure response. If the difference between the time of the current failure response and the start time window time is within the time window specified by the rule and the tracking data indicates a number of detected failure responses that equal the criterion specified in the rule, then the action is triggered. If the rule is satisfied, then operational flow proceeds to block 215. Otherwise, operational flow proceeds to block 217.

At block 215, the MFA fatigue attack detector performs the action configured for the rule. As mentioned earlier, performing the action can be any one or a combination of generating and transmitting a notification to another network component or security appliance to cause the breached account to be blocked and prevent further MFA challenges; an alert can be generated and communicated to a security personnel or administrator; and an alert can be presented to the user. Operational flow returns to the ongoing monitoring of block 201.

At block 217, the MFA fatigue attack detector determines whether the time window specified in the rule has expired if the rule has not been satisfied by the aggregate of detected failure responses. The MFA fatigue attack detector determines whether the difference between the time of the current failure response and the window start time is greater than the rule specified time window. If so, then the time for tracking has expired and operational flow proceeds to block 219. If the time has not yet expired, then operational flow returns to the ongoing monitoring of block 201.

At block 219, the MFA fatigue attack detector resets the tracking data. Resetting the tracking data can be implemented differently. The entry for the session can be removed or erased. The entry can be marked as closed but preserved for later analysis. The entry for the session can be preserved but the failure response count and window start time reset to zero or null. Operational flow returns to the ongoing monitoring of block 201.

The example operations are described with reference to a MFA fatigue attack detector for consistency with the earlier figure and/or ease of understanding. The name chosen for the program code is not to be limiting on the claims. Structure and organization of a program can vary due to platform, programmer/architect preferences, programming language, etc. In addition, names of code units (programs, modules, methods, functions, etc.) can vary for the same reasons and can be arbitrary.

Variations

Embodiments can vary from the described examples. For instance, an embodiment can employ a "1-step ahead" approach. For this approach, an MFA attack detector can establish a threshold for failure events and block a MFA challenge prior to the threshold being satisfied. Implementation could configure this as a more aggressive mode of blocking. Embodiments can also monitor MFA challenges and react without waiting for the MFA failure events to satisfy a threshold. In this case, a second threshold for MFA challenges can be set. Regardless of MFA failure events, the MFA attack detector can detect an MFA attack when MFA challenges satisfy this second threshold regardless the failure events.

The flowcharts are provided to aid in understanding the illustrations and are not to be used to limit scope of the claims. The flowcharts depict example operations that can vary within the scope of the claims. Additional operations may be performed; fewer operations may be performed; the operations may be performed in parallel; and the operations may be performed in a different order. It will be understood that each block of the flowchart illustrations and/or block diagrams, and combinations of blocks in the flowchart illustrations and/or block diagrams, can be implemented by program code. The program code may be provided to a processor of a general purpose computer, special purpose computer, or other programmable machine or apparatus.

As will be appreciated, aspects of the disclosure may be embodied as a system, method or program code/instructions stored in one or more machine-readable media. Accordingly, aspects may take the form of hardware, software (including firmware, resident software, micro-code, etc.), or a combination of software and hardware aspects that may all generally be referred to herein as a "circuit," "module" or "system." The functionality presented as individual modules/units in the example illustrations can be organized differently in accordance with any one of platform (operating system and/or hardware), application ecosystem, interfaces, programmer preferences, programming language, administrator preferences, etc.

Any combination of one or more machine readable medium(s) may be utilized. The machine readable medium may be a machine readable signal medium or a machine readable storage medium. A machine readable storage medium may be, for example, but not limited to, a system, apparatus, or device, that employs any one of or combination of electronic, magnetic, optical, electromagnetic, infrared, or semiconductor technology to store program code. More specific examples (a non-exhaustive list) of the machine readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a machine readable storage medium may be any tangible medium that can contain, or store a program for use by or in connection with an instruction execution system, apparatus, or device. A machine readable storage medium is not a machine readable signal medium.

A machine readable signal medium may include a propagated data signal with machine readable program code embodied therein, for example, in baseband or as part of a carrier wave. Such a propagated signal may take any of a variety of forms, including, but not limited to, electromagnetic, optical, or any suitable combination thereof. A machine readable signal medium may be any machine readable medium that is not a machine readable storage medium and that can communicate, propagate, or transport a program for use by or in connection with an instruction execution system, apparatus, or device.

Program code embodied on a machine readable medium may be transmitted using any appropriate medium, including but not limited to wireless, wireline, optical fiber cable, RF, etc., or any suitable combination of the foregoing.

The program code/instructions may also be stored in a machine readable medium that can direct a machine to function in a particular manner, such that the instructions stored in the machine readable medium produce an article of manufacture including instructions which implement the function/act specified in the flowchart and/or block diagram block or blocks.

Figure 3:
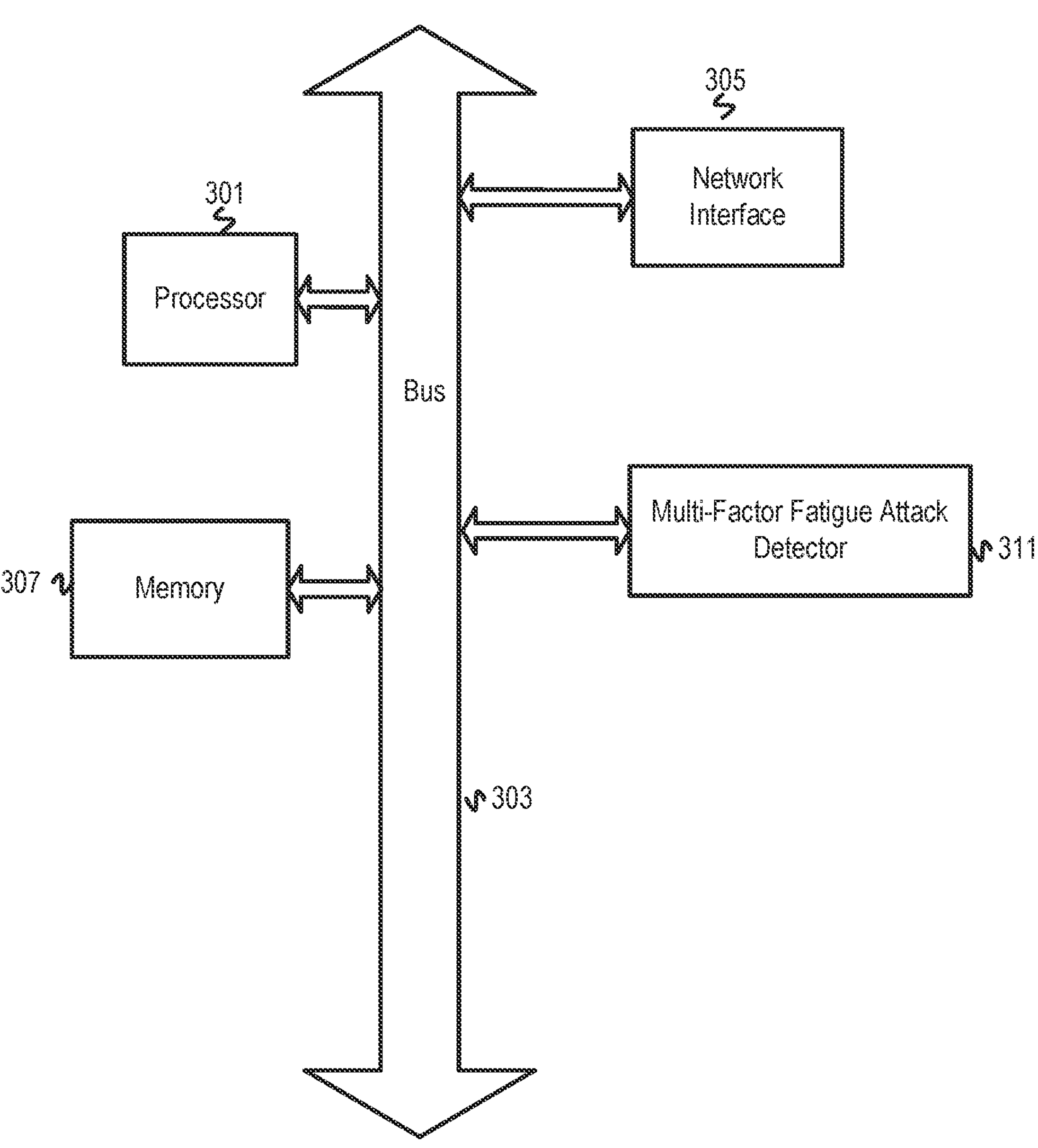
FIG. 3 depicts an example computer system with a MFA fatigue attack detector.

FIG. 3 depicts an example computer system with a MFA fatigue attack detector. The computer system includes a processor 301 (possibly including multiple processors, multiple cores, multiple nodes, and/or implementing multi-threading, etc.). The computer system includes memory 307. The memory 307 may be system memory or any one or more of the above already described possible realizations of machine-readable media. The computer system also includes a bus 303 and a network interface 305. The system also includes MFA fatigue attack detector 311. The MFA fatigue attack detector 311 monitors communications, which can include layer 2/3 network traffic and/or application layer messages for API calls, for MFA failure events. The failure events are responses to MFA challenges that may be indicated as deny, cancel, or timeouts for responding to a MFA challenge. The MFA fatigue attack detector 311 begins tracking failure events upon detection of an initial failure event corresponding to a MFA challenge. The MFA fatigue attack detector 311 determines which MFA fatigue attack detection rule to use based on the MFA implementation of the MFA challenge and tracks the failure events according to the criteria specified by the determined rule. The MFA fatigue attack detector 311 evaluates the tracked data against the rule after failure event detections until either expiration of a time window or triggering of the rule. Any one of the previously described functionalities may be partially (or entirely) implemented in hardware and/or on the processor 301. For example, the functionality may be implemented with an application specific integrated circuit, in logic implemented in the processor 301, in a co-processor on a peripheral device or card, etc. Further, realizations may include fewer or additional components not illustrated in FIG. 3 (e.g., video cards, audio cards, additional network interfaces, peripheral devices, etc.). The processor 301 and the network interface 305 are coupled to the bus 303. Although illustrated as being coupled to the bus 303, the memory 307 may be coupled to the processor 301.

The invention claimed is:

1. A method comprising:

based on detecting a failure event to a first multi-factor authentication (MFA) challenge for a user, tracking failure events to subsequent MFA challenges for the user;

identifying a first MFA implementation indicated in a message corresponding to the failure event;

selecting a first set of a plurality of sets of fatigue attack detection rules that maps to an identifier of the first MFA implementation, wherein the plurality of sets of fatigue attack detection rules maps to different MFA implementations that include the first MFA implementation;

correlating tracked failure events to determine whether the failure events collectively satisfy the first set of fatigue attack detection rules; and based on a determination that the tracked failure events collectively satisfy the first set of fatigue attack detection rules, performing a security action defined for the first set of fatigue attack detection rules.

2. The method of claim 1, wherein performing the security action comprises blocking additional subsequent MFA challenges to the user of the first MFA implementation for at least a defined time period.

3. The method of claim 1, wherein performing the security action comprises blocking access of an account of the user.

4. The method of claim 1, wherein the first set of fatigue attack detection rules indicates criteria comprising a quantity of failure events within a time window.

5. The method of claim 1, wherein selecting the first set of fatigue attack detection rules comprises selecting a first of a plurality of fatigue attack signatures and wherein correlating tracked failure events comprises evaluating network traffic communicating the failure events against the first fatigue attack signature.

6. The method of claim 1, further comprising analyzing network traffic corresponding to failure events for MFA challenges of the different MFA implementations and determining the plurality of sets of fatigue attack detection rules based on the analysis.

7. The method of claim 1, wherein tracking failure events comprises at least one of analyzing network traffic carrying the failure events and analyzing application programming interface (API) calls of an identity provider corresponding to the first MFA challenge and the subsequent MFA challenges.

8. The method of claim 1, wherein identifying the first MFA implementation comprises identifying the MFA implementation based on at least one of an identity provider indicated in the message, a message body, and a message header field.

9. A non-transitory machine readable medium having program code stored thereon, the program code comprising instructions to:

based on detecting a failure event to a first multi-factor authentication (MFA) challenge for a user, track failure events to subsequent MFA challenges for the user;

identify an MFA implementation indicated in a message corresponding to the failure event;

select a first of a plurality of fatigue attack detection rules that maps to the identified MFA implementation, wherein the plurality of fatigue attack detection rules maps to a plurality of MFA implementations which include the identified MFA implementation;

determine whether the tracked failure events collectively satisfy the first fatigue attack detection rule; and based on a determination that the failure events collectively satisfy the first fatigue attack detection rule, perform a security action defined for the first fatigue attack detection rule.

10. The non-transitory machine readable medium of claim 9, wherein the instructions to perform the security action comprise instructions to block additional subsequent MFA challenges to the user of the identified MFA implementation for at least a defined time period.

11. The non-transitory machine readable medium of claim 9, wherein the instructions to perform the security action comprise instructions to block access of an account of the user corresponding to the first MFA challenge and the subsequent MFA challenges.

12. The non-transitory machine readable medium of claim 9, wherein the first fatigue attack detection rule indicates criteria that at least comprise a quantity of failure events within a time window.

13. The non-transitory machine readable medium of claim 9, wherein the instructions to select the first fatigue attack detection rule comprise instructions to select a first of a plurality of fatigue attack signatures and wherein the instructions to determine whether the tracked failure events collectively satisfy the first fatigue attack detection rule comprise instructions to evaluate network traffic communicating the failure events against the first fatigue attack signature.

14. The non-transitory machine readable medium of claim 9, wherein the instructions to track failure events to subsequent MFA challenges comprise instructions to maintain a count of the failure events within a time window.

15. The non-transitory machine readable medium of claim 9, wherein the program code further comprises instructions to analyze network traffic of failure events to MFA challenges of the plurality of MFA implementations and determine the plurality of fatigue attack detection rules based on the analysis.

16. The non-transitory machine readable medium of claim 9, wherein the instructions to track failure events comprise at least one of instructions to analyze network traffic carrying the failure events and instructions to analyze application programming interface (API) calls of an identity provider corresponding to the MFA challenges.

17. The non-transitory machine readable medium of claim 9, wherein the instructions to identify the MFA implementation comprise instructions to identify the MFA implementation based on at least one of an identity provider indicated in the message, a message body, and a message header field.

18. An apparatus comprising:

a processor; and a non-transitory machine-readable medium having stored thereon instructions executable by the processor to cause the apparatus to, monitor for multi-factor authentication (MFA) failure events;

based on detection of a failure event to a first MFA challenge for a user, track failure events to subsequent MFA challenges for the user;

identify an MFA implementation indicated in a message corresponding to the failure event;

select a first of a plurality of fatigue attack detection rules that maps to the identified MFA implementation, wherein the plurality of fatigue attack detection rules maps to a plurality of MFA implementations which include the identified MFA implementation;

determine whether the tracked failure events collectively satisfy the first fatigue attack detection rule; and based on a determination that the failure events satisfy the first fatigue attack detection rule, generate an alert indicating detection of a likely fatigue attack targeting the user.

19. The apparatus of claim 18, wherein the instructions to track failure events to subsequent MFA challenges comprise instructions to track characteristics of the failure events, wherein the tracked characteristics correspond to criteria defined in the first fatigue attack detection rule.

20. The apparatus of claim 18, wherein the instructions to identify the MFA implementation comprise instructions to identify the MFA implementation based on at least one of an identity provider indicated in the message, a message body, and a message header field.

* * * * *